US009816683B2

(12) United States Patent
Hu et al.

(10) Patent No.: US 9,816,683 B2
(45) Date of Patent: Nov. 14, 2017

(54) LIGHT SOURCES SYSTEM AND PROJECTION DEVICE USING THE SAME

(71) Applicant: Appotronics Corporation Limited, Shenzhen (CN)

(72) Inventors: Fei Hu, Shenzhen (CN); Yi Li, Pleasanton, CA (US); Liangliang Cao, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 673 days.

(21) Appl. No.: 13/655,869

(22) Filed: Oct. 19, 2012

(65) Prior Publication Data

US 2013/0100644 A1    Apr. 25, 2013

Related U.S. Application Data (60) Provisional application No. 61/549,367, filed on Oct. 20, 2011.

(51) Int. Cl.
*F21V 9/00* (2015.01)
*F21V 7/22* (2006.01)
(Continued)

(52) U.S. Cl.
CPC .............. *F21V 7/22* (2013.01); *G03B 21/204* (2013.01); *G03B 21/2066* (2013.01); *F21K 9/64* (2016.08);
(Continued)

(58) Field of Classification Search
CPC ..... F21K 9/56; F21K 9/54; F21K 9/50; F21K 9/90; F21K 2099/005; F21V 9/16;
(Continued)

(56) References Cited

U.S. PATENT DOCUMENTS 5,537,229 A * 7/1996 Brandestini ........ H04N 1/02815
257/89
2005/0105301 A1* 5/2005 Takeda ................. F21S 48/1154
362/545
(Continued)

FOREIGN PATENT DOCUMENTS

CN        101581410 A    11/2009
CN        101836160 A     9/2010
(Continued)

OTHER PUBLICATIONS

Li Yi, Light source, control method for light source, and projection system having light source, Oct. 14, 2010, WO 2010115345 A1, English translation.*

(Continued)

*Primary Examiner* — Jong-Suk (James) Lee
*Assistant Examiner* — James Endo
(74) *Attorney, Agent, or Firm* — Chen Yoshimura LLP (57) ABSTRACT

A projection device including a light source system having an excitation light source for generating a excitation light, a wavelength conversion device, a supplemental light source for generating a supplemental light, a light introducing device for directing the supplemental light to the wavelength conversion device, a light collection device for collecting the supplemental light that scattered and reflected by the wavelength conversion device. By setting the relative sizes of the light introducing device and the light collection device, the luminous flux of the supplemental light that is lost due to the light introducing device is less than or equal to a quarter of that the luminous flux of the supplemental light collected by the light collection device. The converted light is supplemented by the supplemental light.

18 Claims, 5 Drawing Sheets

(51) Int. Cl.
*G03B 21/20* (2006.01)
*F21K 9/64* (2016.01)
*F21V 9/16* (2006.01)
*F21Y 115/30* (2016.01)
*F21Y 115/10* (2016.01)

(52) U.S. Cl.
CPC ............ *F21V 9/16* (2013.01); *F21Y 2115/10* (2016.08); *F21Y 2115/30* (2016.08)

(58) Field of Classification Search
CPC ............ F21Y 2101/025; G03B 21/204; G03B 21/2066; G03B 33/00
See application file for complete search history.

(56) References Cited

U.S. PATENT DOCUMENTS

| | | | |
|---|---|---|---|
| 2005/0135095 A1* | 6/2005 | Geissler | G03B 33/12 362/231 |
| 2005/0270775 A1* | 12/2005 | Harbers et al. | 362/231 |
| 2006/0072314 A1* | 4/2006 | Rains | F21K 9/54 362/231 |
| 2006/0227302 A1* | 10/2006 | Harbers et al. | 353/94 |
| 2006/0262514 A1* | 11/2006 | Conner et al. | 362/19 |
| 2007/0170447 A1* | 7/2007 | Negley | H01L 33/504 257/98 |
| 2009/0034284 A1* | 2/2009 | Li et al. | 362/84 |
| 2009/0040523 A1* | 2/2009 | Brukilacchio | 356/432 |
| 2009/0052189 A1* | 2/2009 | Kon | F21S 48/1154 362/296.01 |
| 2009/0284148 A1* | 11/2009 | Iwanaga | 313/506 |
| 2009/0296368 A1* | 12/2009 | Ramer | 362/84 |
| 2010/0046234 A1 | 2/2010 | Abu-Ageel | |
| 2011/0044046 A1* | 2/2011 | Abu-Ageel | 362/259 |
| 2011/0044070 A1* | 2/2011 | Takahashi | F21K 9/00 362/553 |
| 2011/0157865 A1* | 6/2011 | Takahashi et al. | 362/84 |
| 2011/0205502 A1 | 8/2011 | Kato et al. | |
| 2011/0249242 A1 | 10/2011 | Saitou et al. | |
| 2011/0249436 A1* | 10/2011 | Li et al. | 362/235 |
| 2011/0273079 A1* | 11/2011 | Pickard | H01L 33/504 313/483 |
| 2011/0279007 A1* | 11/2011 | Kishimoto | 313/45 |
| 2011/0292636 A1* | 12/2011 | Fukai et al. | 362/19 |
| 2011/0310353 A1 | 12/2011 | Maeda | |
| 2012/0026721 A1* | 2/2012 | Kurt et al. | 362/84 |
| 2012/0104934 A1* | 5/2012 | Fukai et al. | 313/498 |
| 2012/0106178 A1* | 5/2012 | Takahashi et al. | 362/459 |
| 2012/0206900 A1* | 8/2012 | Yang et al. | 362/84 |

FOREIGN PATENT DOCUMENTS

| | | |
|---|---|---|
| CN | 102252169 A | 11/2011 |
| CN | 102722073 A | 10/2012 |
| JP | 2005-347263 A | 12/2005 |
| JP | 2011-248272 A | 12/2011 |
| WO | 2009/092041 A2 | 7/2009 |
| WO | WO 2010115345 A1 * | 10/2010 |
| WO | 2011/092842 A1 | 8/2011 |
| WO | 2011/118536 A1 | 9/2011 |

OTHER PUBLICATIONS

International Search Report in related PCT application No. PCT/CN2012/084921, dated Feb. 23, 2013.

Written Opinion in related PCT application No. PCT/CN2012/084921, dated Feb. 23, 2013.

Chinese Office Action, dated Mar. 5, 2014, and Search Report dated Feb. 17, 2014, in related Chinese patent application, No. CN 201210027483.5.

Japanese Office Action, dated Aug. 30, 2016 in related Japanese patent application, No. JP 2014-546292.

Extended European Search Report in related application EP 12860277.8, dated Nov. 10, 2015.

* cited by examiner

A typical phosphor's absorption, emission and blue laser, green laser and red laser's spectra

Fig. 10

LIGHT SOURCES SYSTEM AND PROJECTION DEVICE USING THE SAME

This application claims priority under 35 USC §119(e) from U.S. Provisional Patent Application No. 61/549,367 filed Oct. 20, 2011 which is herein incorporated by reference in its entirety.

BACKGROUND OF THE INVENTION

Field of the Invention

This invention relates to the field of optical technology, and in particular, it relates to light source systems and projection devices using the light sources.

Description of the Related Art

Currently, high brightness color light sources are needed in a wide variety of applications, including stage lighting, projection display and RGB (red, green and blue) backlight, etc. Traditionally, gas discharge lamp (for example, super high pressure mercury lamp) as a high brightness light source has been used in special lighting and display fields. However, mercury can cause environmental pollution, and an environmental friendly light source which can replace the super high pressure mercury lamp is highly desired in the industry.

Figure 1:
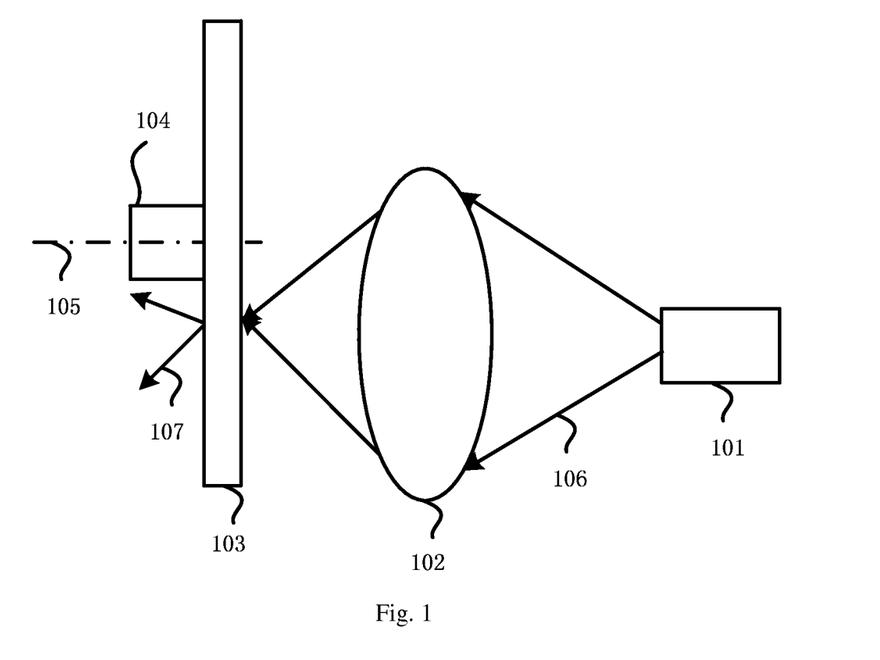
FIG. 1 illustrates a conventional light source system.

FIG. 1 is the structure diagram of a current light source technology. As shown in FIG. 1, the light source system comprises an excitation light source 101, an optical lens 102, a color wheel 103 and a driving device 104. The excitation light source 101 is used to generate an excitation light 106. The optical lens 102 converges the excitation light 106 and relays it to the color wheel 103. The color wheel 103 has different segments with different phosphors coated on them respectively. When the color wheel 103 rotates around the rotation axis 105 under the driving of the driving device 104, a color light sequence is generated from phosphor coatings excited by the excitation light 106 successively. For example, the phosphor coatings may include red phosphor, green phosphor and yellow phosphor. So when the red phosphor segment in the color wheel 103 is in the propagation path of the excitation light, high brightness red light is generated by the red phosphors that is under the excitation of the excitation light 106. The generation process of the green light and yellow light are the same as the red light.

However, among all the current phosphor coatings, the conversion efficiency of the red phosphor is much lower than the other color phosphor. So there need be an additional light source to improve the red color light.

Figure 2:
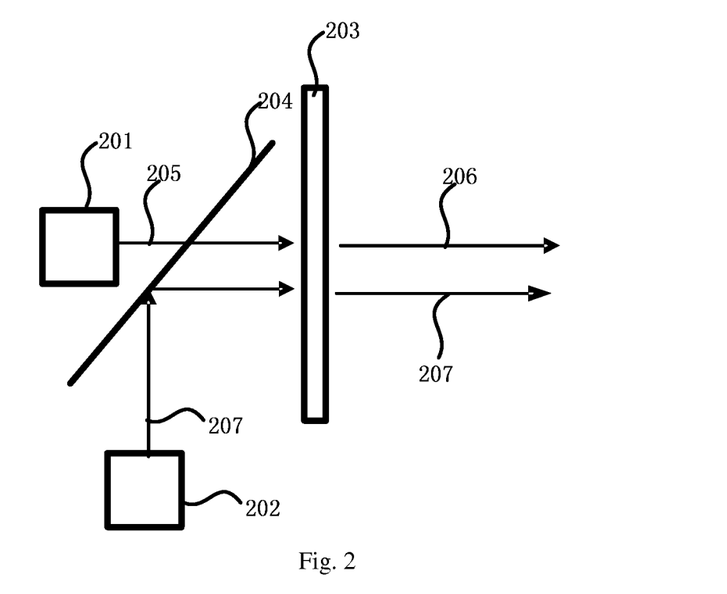
FIG. 2 illustrates another conventional light source system.

FIG. 2 is the structure diagram of another current light source technology. As shown in FIG. 2, the light source system comprises an excitation light source 201, a supplemental light source 202, a light conversion device 203 generating a red light, and a dichroic filter 204. The red light 207 generated by the supplemental light source 202 and the excitation light 205 generated by the excitation light source 201 (e.g. blue color light) are combined by the dichroic filter 204, and then the red light 207 is incident to and transmitted by the light conversion device 203 while the excitation light 205 is used to excite the light conversion device 203 to generate red converted light 206. So the red converted light 206 is supplemented by the red light 207. Unfortunately, the light conversion device 203 has high reflectivity for red light, which is usually about 50%, so the red light 207 reflected by the light conversion device 203 will propagate along the incoming path back to the supplemental light source 202, which result in a reduction of optical efficiency. Moreover, for the red converted light 206 generated by the light conversion device 203, only a part of it can propagate forward, and the rest will propagate backward toward the dichroic filter 204 and ultimately reaches the excitation light source 201 or reflected to the supplemental light source 202. This also causes a low optical efficiency.

In conclusion, a light source system and a projection device are desired that can solve the above technology problems generally existing in current light source system.

SUMMARY OF THE INVENTION

The present invention provides a light source system and a projection device to solve the above problems and improve the efficiency of the light source.

To solve the above problems, the present invention provides a light source system, which includes: an excitation light source, a wavelength conversion device, a first supplemental light source, a first light introducing device and a first light collection device. The excitation light source is used to generate an excitation light. The wavelength conversion device is used to convert the excitation light to converted light. The first supplemental light source is used to generate a first supplemental light. The spectral range of the first supplemental light overlaps with the spectral range of the converted light. The first light introducing device is used to direct the first supplemental light to the wavelength conversion device which scatters and at least partially reflects the first supplemental light. The first light collection device collects the scattered and reflected light of the first supplemental light. In this system, the sizes of the first light introducing device and the first light collection device meet the conditions that: the luminous flux of the first supplemental light which is scattered and reflected by the wavelength conversion device and escapes from the first light introducing device is less than or equal to a quarter of the luminous flux of the first supplemental light collected by the first light collection device.

To solve the above technical problems, the present invention also provides a projection device including the above light source system.

The advantage of this invention is: light introducing device is used to direct the supplemental light to the wavelength conversion device, light collection device is used to collect the supplemental light which is scattered and reflected by the wavelength conversion device. Through setting the sizes of the light introducing device and the light collection device, the luminous flux of the supplemental light which is scattered and reflected by the wavelength conversion device and escapes from the light introducing device is less than or equal to a quarter of the luminous flux of the supplemental light collected by the light collection device, which can avoid the loss of the supplemental light caused by the reflection of the wavelength conversion device and improve the efficiency.

DETAILED DESCRIPTION OF THE PREFERRED EMBODIMENTS

Figure 3:
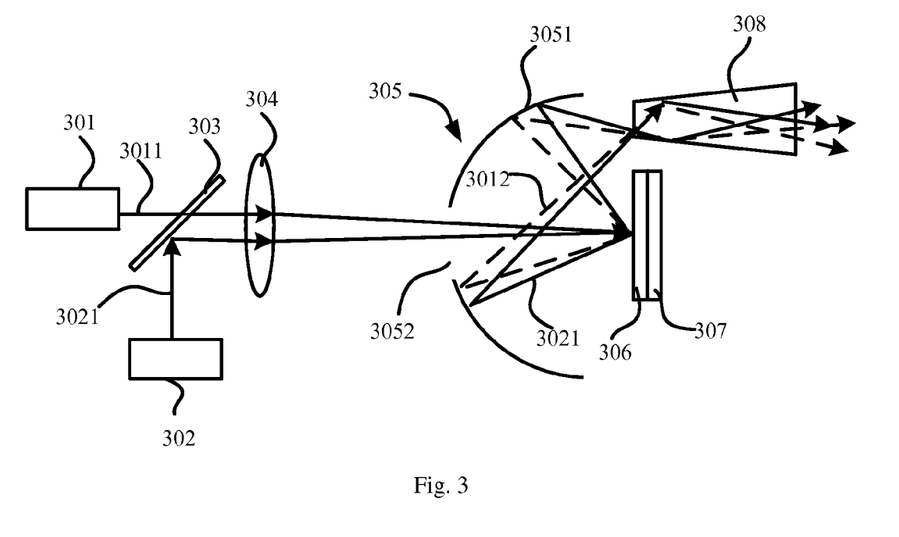
FIG. 3 illustrates the structure of a light source system according to a first embodiment of the present invention.

FIG. 3 is the structure diagram of a light source system according to a first embodiment of the present invention. As show in FIG. 3, the light source system in this embodiment mainly includes an excitation light source 301, a supplemental light source 302, a light combination device 303, a light collection device 304, a light reflection device 305, a wavelength conversion device 306, a reflection substrate 307 and a light homogenization device 308. The light reflection device 305 includes a curved reflection surface 3051(for example, spherical reflection surface or ellipsoidal reflection surface) with an opening 3052 on it. The opening 3052 can be a through hole or a transparent zone.

The excitation light source 301 generates an excitation light 3011. The supplemental light source 302 generates a supplemental light 3021. The excitation light 3011 and the supplemental light 3021 are combined by the light combination device 303, then the combined light is incident to the light collection device 304. After collected and relayed by the light collection device 304, the combined light is incident onto the wavelength conversion device 306 through the opening 3052. The wavelength conversion device 306 absorbs the incident excitation light 3011 and converts it to a converted light 3012 whose wavelength is different from that of the excitation light 3011. The converted light 3012 generated by the wavelength conversion device 306 is isotropic, so a part of the converted light 3012 will propagate in the opposite direction of the excitation light 3011 while other part of the converted light 3012 will propagate in the forward direction. Meanwhile, a part of the excitation light 3011 which is transmitted through the wavelength conversion device 306 will be reflected by the reflection substrate 307 located on the side of the wavelength conversion device 306 facing away from the excitation light source 301. The incident supplemental light is further scattered by the wavelength conversion device 306. A part of the scattered supplemental light 3021 is reflected directly by the wavelength conversion device 306 and propagates towards the light reflection device 305, while other part of the scattered supplemental light 3021 passes through the wavelength conversion device 306 and is reflected by the reflection substrate 307 back to the wavelength conversion device 306 and passes through it. The curved reflection surface 3051 collects most of the converted light 3012 and most of the supplemental light 3021 and directs them to the light homogenization device 308 for homogenization.

In the first embodiment, the curved reflection surface 3051 may be ellipsoidal, which can reflect the light from one focus point to another. In this situation, the incident positions on the wavelength conversion device 306 of the excitation light 3011 and the supplemental light 3021 are located in the vicinity of one focus point, while the input port of the light homogenization device 308 is located in the vicinity of the other focus point. The curved reflection surface 3051 also may be spherical, which can reflect light emitted from one point near the spherical center to another point symmetrical to the first point with respect to the spherical center. In this situation, the incident positions on the wavelength conversion device 306 of the excitation light 3011 and the supplemental light 3021 are located in the vicinity of one of the two symmetrical points, while the input port of the light homogenization device 308 is located in the vicinity of the other point.

Because the Etendue of the converted light 3012 and the supplemental light 3021emitted from the wavelength conversion device 306 is four times or more of the Etendue of the excitation light 3011 and the supplemental light 3021 incident through the opening 3052, in this embodiment, by setting the sizes of the opening 3052 and the curved reflection surface 3051 appropriately, the luminous flux of the converted light 3012 and the supplemental light 3021 escaped from the opening 3052 will be less than or equal to a quarter of the luminous flux of the converted light 3021 and the supplemental light 3012 that are collected by the curved reflection surface 3051. Consequentially, the converted light 3012 and the supplemental light 3021 can be effectively collected, and excessive light loss due to the opening 3052 can be avoid. Specifically, in this embodiment, the area of the opening 3052 is less than or equal to a quarter of the area of the curved reflection surface 3051.

In the first embodiment, the excitation light source 301 and the supplemental light source 302 may be LED or laser diode. The spectral range of the supplemental light 3021 is different from that of the excitation light 3011, and at least partially overlaps with the converted light 3012, so it is a supplement to the luminance of the converted light 3012. Preferably, the dominant wavelength of the converted light 3012 is different from that of the supplemental light 3021 by less than 20 nanometers. Preferably, the spectral range of the supplemental light 3021 is narrower than that of the converted light 3012, so it can improve the color saturation of the mixed light of the supplemental light 3021 and the converted light 3012. Moreover, the illumination areas of the excitation light 3011 and the supplemental light 3021 at least partially overlap on the wavelength conversion device 306 in order that the supplemental light 3021 and the converted light 3012 can be mixed adequately.

It is easy to understand that the spectral range of the supplemental light and the converted light may not overlap. For example, the wavelength conversion device may emit green converted light under excitation while the supplemental light source is red LED. In this situation, the green converted light and the red supplemental light can also be collected by the light collection device 304.

In this embodiment, the wavelength conversion device 306 may be a transparent substrate with wavelength conversion materials doped in the interior, or a reflection substrate 307 with a layer or wavelength conversion materials coated on the surface. The wavelength conversion material may be phosphor powder or quantum dot material that is known in the art. Moreover, in the interior of the transparent substrate or on the surface of the transparent substrate or the reflection substrate, scattering particles or scattering structures may be provided to improve the scattering effect of the wavelength conversion device 306. The light combination device 303 may be a dichroic filter or a polarization beam splitter that is known in the art. The light collection device 304 may be a lens or lens group. The light homogenization device 308 may be an integrating rod which is known in the art. And as known in the art, the light combination device 303, the light collection device 304, the reflection substrate 307 and the light homogenization device 308 are not the essential elements to realize the purpose of the present invention, so they can be omitted according to the actual situations. For example, when the excitation light 3011 and the supplemental light 3021 are incident into the opening 3052 side by side or from different incident angles, the light collection device 304 can be omitted.

Making use of the above-described light source system, the excitation light 3011 generated by the excitation light source 301 and the supplemental light 3021 generated by the supplemental light source 302 are directed to the wavelength conversion device 306 by the opening 3052, and most of the converted light 3012 and the supplemental light 3021 emitted from the wavelength conversion device 306 are collected by the curved reflection surface 3051. By setting the sizes of the opening 3052 and the curved reflection surface 3051 appropriately, the luminous flux of the converted light 3012 and the supplemental light 3021 escaped from the opening 3052 can be less than or equal to a quarter of the luminous flux of the converted light 3012 and the supplemental light 3021 that is collected by the curved reflection surface 3051, which can avoid the loss of the converted light 3012 and the supplemental light 3021 and the efficiency of the light source system is improved.

Figure 4:
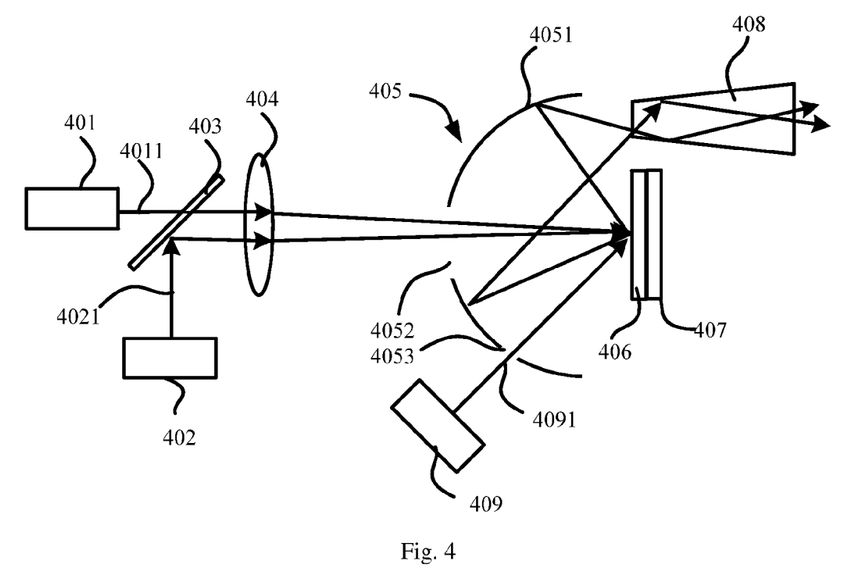
FIG. 4 illustrates the structure of a light source system according to a second embodiment of the present invention.

FIG. 4 is the structure schematic diagram of the light source according to a second embodiment of the present invention. As shown in FIG. 4, the light source system in this embodiment mainly includes a excitation light source 401, a first supplemental light source 402, a light combination device 403, a light collection device 404, a light reflection device 405, a wavelength conversion device 406, a reflection substrate 407, a light homogenization device 408 and a second supplemental light source 409. In this embodiment, the light reflection device 405 includes a curved reflection surface 4051. Moreover, it includes a first opening 4052 and a second opening 4053 located on the curved reflection surface 4051. The excitation light 4011and the first supplemental light 4021 are incident onto the wavelength conversion device 406 through the first opening 4052 in the same way shown in FIG. 3. The wavelength conversion device 406 then emits the converted light and the first supplemental light (not shown) in the reversed direction. The curved reflection surface 4051 collects most of these two lights and directs them to the light homogenization device 408. The differences between the light source system in this embodiment and that the light source system shown in FIG. 3 are that: the light source system of this embodiment further includes the second supplemental light source 409, and there is a second opening 4053 on the curved reflection surface 4051. The second supplemental light 4091 generated by the second supplemental light source 409 is incident onto the wavelength conversion device 406 through the second opening 4053, and scattered by the wavelength conversion device 406. A part of the scattered second supplemental light 4091 is reflected by the wavelength conversion devices 406 and propagates in the reversed direction of the incident supplemental light 4091, while another part of the scattered second supplemental light 4091 passes through the wavelength conversion device 406 and is reflected by the reflection substrate 407 back to the wavelength conversion device 407 and passes through it again. Most of the second supplemental light 4091 is collected by the curved reflection surface 4051 and directed into the light homogenization device 408 to be homogenized with the converted light and the first supplemental light inside.

Figure 10:
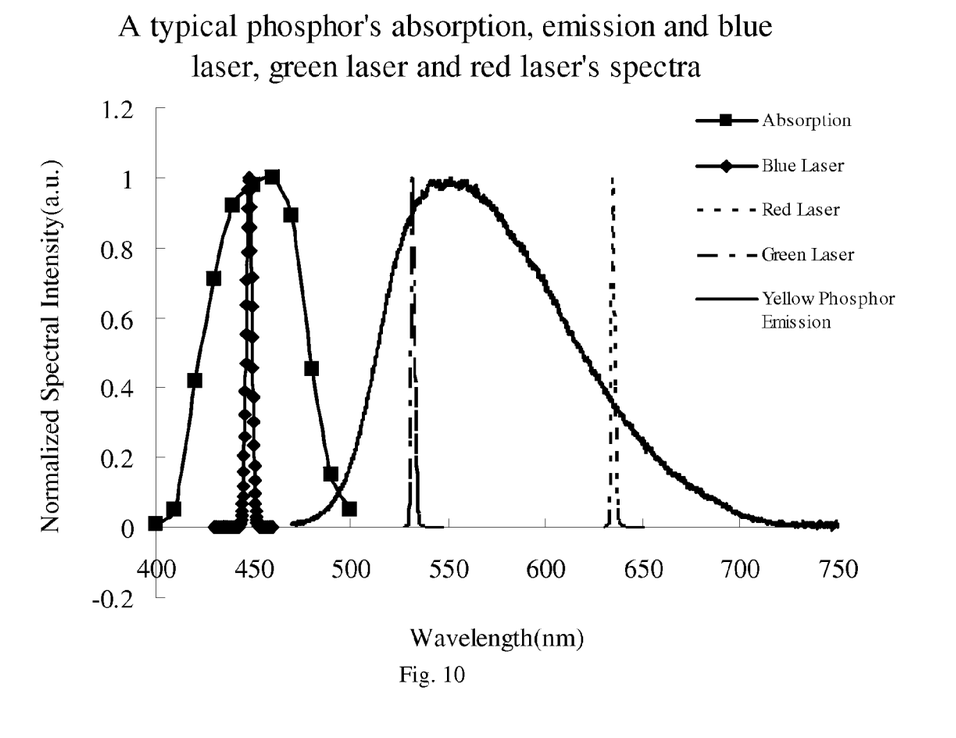
FIG. 10 shows a YAG: Ce phosphor's absorption spectrum and emission spectrum, and the spectra of red, green and blue lasers.

In this embodiment, by setting the size of the second opening 4053 and the size of curved reflection surface 4051 appropriately, the luminous flux of the second supplemental light 4092 that is scattered and reflected by the wavelength conversion device 406 and escapes from the second opening 4053 is less than or equal to a quarter of the luminous flux of the second supplemental light 4092 that is collected by the curved reflection surface 4051. Correspondingly, the area of the second opening 4053 is less than or equal to a quarter of the curved reflection surface's size. Moreover, the spectral range of the second supplemental light 4091 and the first supplemental light 4021 may be the same, or be different but both overlap with the spectral range of the converted light. For example, the converted light is yellow phosphor light, and the first supplemental light 4021 may be red light from red laser diode or red LED, while the second supplemental light 4091 may be green light from green laser diode or green LED. FIG. 10 shows the spectrum of a typical YAG: Ce phosphor's emission, as well as the spectrum of a blue laser (which may be used at the excitation light), a green laser and a red laser. In another embodiment, the second supplemental light 4091 generated by the second supplemental light source 409 passes through the first opening 4052 to be incident onto the wavelength conversion device 406. In other embodiments, other supplemental light sources and corresponding openings can be added to the light source system, which can further improve the luminous flux of the converted light generated by the wavelength conversion device 406.

Making use of the above-described light source system, by using the first supplemental light source 402 and the second supplemental light source 409 to supplement the luminous flux of the converted light generated by the wavelength conversion device 406 simultaneously, by using the curved reflection surface 4051 to efficiently collected the converted light, the first supplemental light 4021 and the second supplemental light 4091, the output efficiency of the light source system can be improved.

Figure 5:
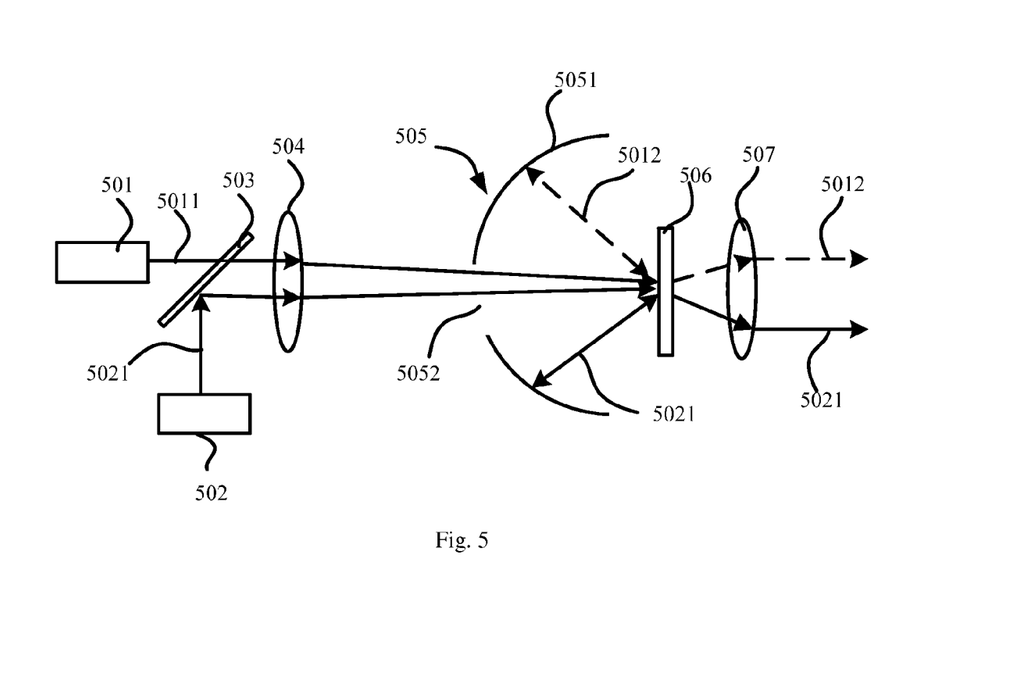
FIG. 5 illustrates the structure of a light source system according to a third embodiment of the present invention.

FIG. 5 is the structure schematic diagram of the light source system according to a third embodiment of the present invention. As show in FIG. 5, the light source system in this embodiment mainly includes an excitation light source 501, a supplemental light source 502, a light combination device 503, a light collection device 504, a light reflection device 505, a wavelength conversion device 506, and another light collection device 507. In this embodiment, the light reflection device 505 includes a curved reflection surface 5051 with an opening 5052 on it. The excitation light 5011 generated by the excitation light source 501 and the supplemental light 5021 generated by the supplemental light source 502 are incident onto the wavelength conversion device 506 through the opening 5052 in the same way shown in FIG. 3.

The differences between the light source system of this embodiment and in the system shown in FIG. 3 are that: in this embodiment, there is not reflection substrate on the side of the wavelength conversion device 506 that faces away from the excitation light source 501 and the supplemental light source 502. So a part of converted light 5012 generated by the wavelength conversion device 506 which propagates in forward direction will be collected by the light collection device 507 (such as lens or lenses). The converted light 5012 generated by the wavelength conversion device 506 which propagates in the backward direction is incident onto the curved reflection surface 5051 and reflected back to the wavelength conversion device 506 and passes through it again before being collected by the light collection device 507. In this embodiment, when the curved reflection surface 5051 is spherical, the incident position of the excitation light 5011 and the supplemental light 5021 on the wavelength conversion device 506 is located in the vicinity of the center of the curved reflection surface 5051.

Figure 6:
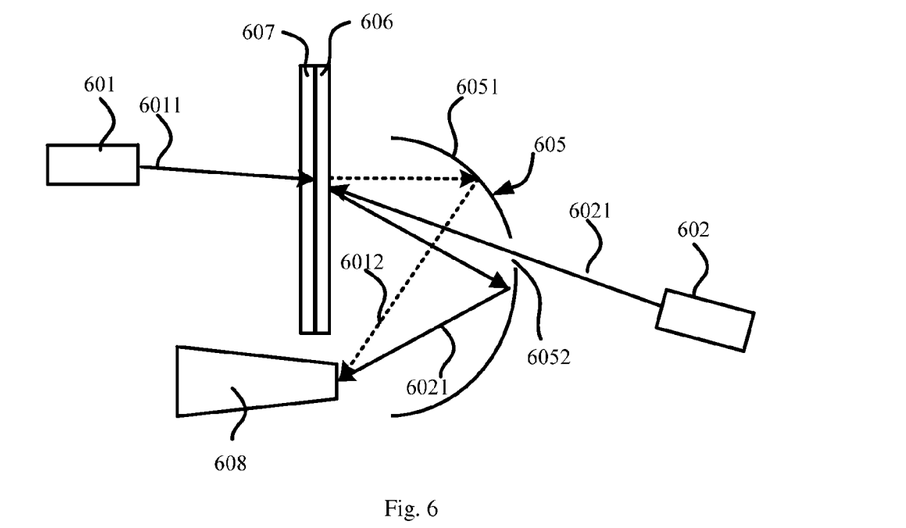
FIG. 6 illustrates the structure of a light source system according to a fourth embodiment of the present invention.

FIG. 6 is the structure schematic diagram of the light source system according to a fourth embodiment of the present invention. As show in FIG. 6, the light source system in this embodiment mainly includes an excitation light source 601, a supplemental light source 602, a light reflection device 605, a wavelength conversion device 606, a reflection substrate 607 and a light homogenization device 608. In this embodiment, the light reflection device 605 includes a curved reflection surface 6051 with an opening 6052 on it.

The differences between the light source system of this embodiment and the system shown in FIG. 3 lie in that: in this embodiment, the excitation light source 601 and the supplemental light source 602 are located on different sides of the wavelength conversion device 606, and the reflection substrate 607 is located on the side of the wavelength conversion device 606 that is facing away from the light reflection device 605 and the supplemental light source 602. The reflection substrate 607 is a dichroic filter which can transmit the excitation light 6011 generated by the excitation light source 601, reflect the supplemental light 6021 generated by the supplemental light source 602, and reflect the converted light 6012 generated by the wavelength conversion device 606. The excitation light 6011 generated by the excitation light source 601 is incident onto the dichroic filter 607 from the side facing away from the wavelength conversion device 606, then transmits through it and is incident to the wavelength conversion device 606. The converted light 6012 propagates in the forward direction of the excitation light is incident to the curved reflection surface 6051 directly, while the converted light 6012 propagates in the backward direction is reflected by the dichroic filter 607 back to the wavelength conversion device 606 again and transmits through it before incident onto the curved reflection surface 6051. Both these two converted light 6012 are reflected by the curved reflection surface 6051 and collected by the light homogenization device 608. The supplemental light 6021 generated by the supplemental light source 602 is incident to the wavelength conversion device through the opening 6052. The supplemental light 6021 scattered and reflected by the wavelength conversion device 606 and the dichroic filter 607 is incident to the curved reflection surface 6051 and then collected by the light homogenization device 608.

In the other embodiment, the dichroic filter 607 can be replaced by a reflection substrate with opening on it. In this situation the excitation light 6011 generated by the excitation light source 601 is incident to the wavelength conversion device 606 through this opening, while the supplemental light 6021 and the converted light which propagates towards the excitation light source 601 are reflected by the reflection substrate.

The dichroic filter 607 can also be replaced by a spherical reflection substrate with opening on it, which is separated from the wavelength conversion device 606, similar to the reflector 605 but located between the excitation light source 601 and the wavelength conversion device 606. The excitation light 6011 generated by the excitation light source 601 is incident to the wavelength conversion device 606 through the opening, and the converted light which propagates towards the excitation light source will be reflected back to the wavelength conversion device 606 again and transmit it.

Figure 7:
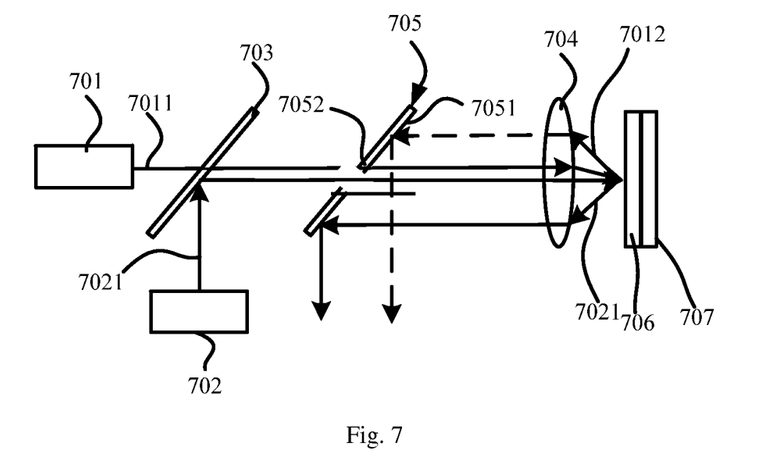
FIG. 7 illustrates the structure of a light source system according to a fifth embodiment of the present invention.

FIG. 7 is the structure schematic diagram of the light source system according to a fifth embodiment of the present invention. As show in FIG. 7, the light source system in this embodiment mainly includes an excitation light source 701, a supplemental light source 702, a light combination device 703, a light collection device 704, a light reflection device 705, a wavelength conversion device 706, and a reflection substrate 707. The difference between the light source system of this embodiment and the system shown in FIG. 3 lies in that the light reflection device 305 in FIG. 3 is replaced by the light reflection device 705 and the light collection device 704. The light reflection device 705 includes a flat reflection surface 7051 with an opening 7052 on it. In this embodiment, the excitation light 7011 generated by the excitation light source 701 and the supplemental light 7021 generated by the supplemental light source 702 are incident to the light collection device 704 through the opening 7052 and then is relayed to the wavelength conversion device 706 by the light collection device 704 (such as lens or lenses). Because of the reflection substrate 707 located on the side of the wavelength conversion device 706 facing away from the excitation light source 701, the converted light 7012 and the supplemental light 7021 will propagate in the direction towards the excitation light source 701 and reflected by the flat reflection surface 7051 as the output of this light source system. In this embodiment, by setting the sizes of the opening 7052 and the flat reflection surface 7051 appropriately, the luminous flux of the converted light 7012 and the supplemental light 7021 escaping from the opening 7052 will be less than or equal to a quarter of the luminous flux of the converted light and the supplemental light that is collected by the flat reflection surface 7051. Correspondingly, in this embodiment, the area of the opening 7052 is less than or equal to a quarter of the area of the flat reflection surface 7051. In other embodiments, when the area of the flat reflection surface is large enough that it can fully collect the converted light 7012 and the supplemental light 7021, the light collection device 704 can be omitted.

Figure 8:
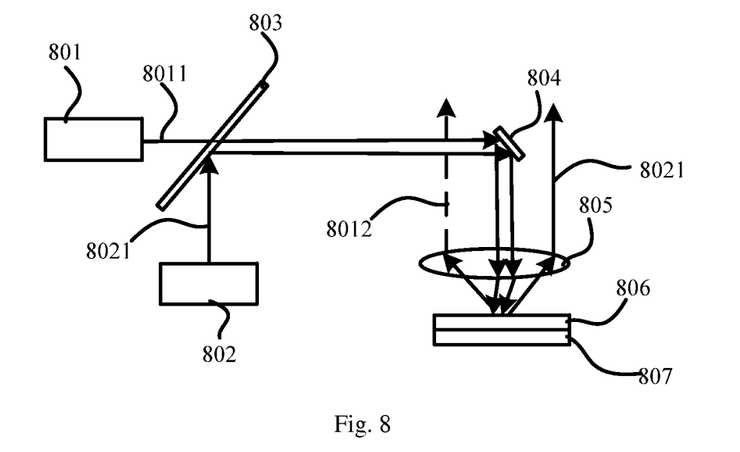
FIG. 8 illustrates the structure of a light source system according to a sixth embodiment of the present invention.

FIG. 8 is the structure schematic diagram of the light source system according to a sixth embodiment of the present invention. As show in FIG. 8, the light source system in this embodiment mainly includes an excitation light source 801, a supplemental light source 802, a light combination device 803, a light reflection device 804, a light collection device 805, a wavelength conversion device 806, and a reflection substrate 807.

The difference between the light source system of this embodiment and the system shown in FIG. 3 is that the light reflection device 305 is replaced by the light reflection device 804 and the light collection device 805. In this embodiment, after the excitation light 8011 generated by the excitation light source 801 and the supplemental light 8021 generated by the supplemental light source 802 are combined by the light combination device 803, the combined light is reflected by the reflection device 804 and directed to the light collection device 805 (such as lens or lenses) to be relayed to the wavelength conversion device 806. The converted light 8012 and the supplemental light 8021 from the wavelength conversion device 806 are collected by the light collection device 805 to output through the area around the light reflection device 804.

In this embodiment, by setting the sizes of the light reflection device 804 and the light collection device 805, the luminous flux of the converted light 8012 and the supplemental light 8021 blocked by the light reflection device 804 will be less than or equal to a quarter of the luminous flux of the converted light 8012 and the supplemental light 8021 collected by the light collection device 805. Correspondingly, the projection area of the reflection device 804 on the light collection device 805 is less than or equal to a quarter of the area of the light collection device 805. In other embodiments, the light collection device 805 can also be a reflection surface (such as a flat reflection device or a curved reflection device) located on a side of the reflection device 804 which is opposite to the wavelength conversion device 806. In this situation, the projection area of the reflection device 804 on this collection surface is less than or equal to a quarter of the area of the collection surface.

Figure 9:
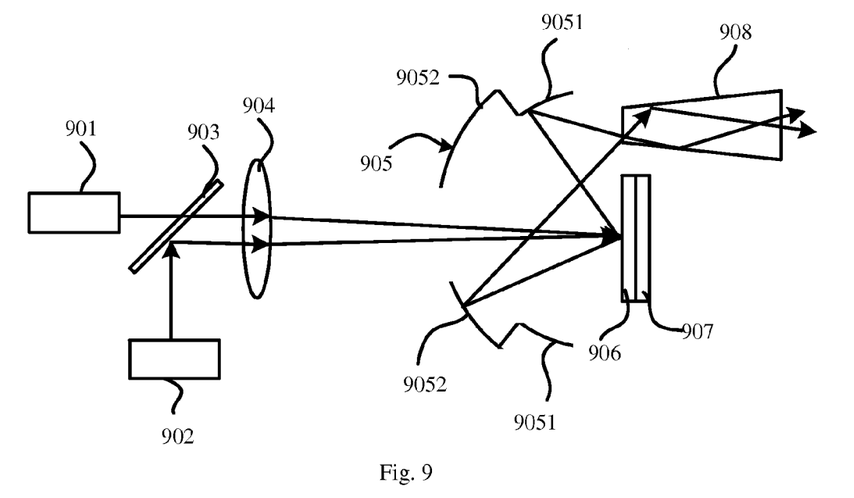
FIG. 9 illustrates the structure of a light source system according to a seventh embodiment of the present invention.

FIG. 9 is the structure schematic diagram of the light source system according to a seventh embodiment of the present invention. As show in FIG. 9, the light source system in this embodiment mainly includes an excitation light source 901, a supplemental light source 902, a light combination device 903, a light collection device 904, a light reflection device 905, a wavelength conversion device 906, a reflection substrate 907 and a light homogenization device 908. The difference between the light source system of this embodiment and the system shown in FIG. 3 lies in that the reflective surface of the light reflection device 905 comprises of two nested concentric spherical reflective surfaces 9051 and 9052 with different diameters. The role of the light reflection device 905 is the same as the reflection surfaces 305, 405, 505 and 605 in the above embodiments. In other embodiments, the reflection device 905 may include more than two nested concentric spherical reflection surfaces or at least two ellipsoidal reflection surfaces which are nested.

In the above embodiments, the wavelength conversion device may be carried on a color wheel described in the background section (see FIG. 1, color wheel 103) or other conventional element such as color strip or color drum that can be driven to move laterally or to rotate.

This invention further provides a projection device which includes a light source system described in the above embodiments. The projection device includes, in addition to the light source system, a spatial light modulator for forming an image and projection optics for projecting the light onto a screen.

In the light source system and the projection device according to various embodiments of this invention, the supplemental light is directed to the wavelength conversion device by the light introducing device, scattered and reflected by the wavelength conversion device before being collected by the light collection device. By setting the relative size of the light introducing device and the light collection device, the luminous flux of the supplemental light from the wavelength conversion device that is lost due to the light introducing device is less than or equal to a quarter of the luminous flux of the supplemental light collected by the light collection device, which avoid the loss of the supplemental light due to the reflection by the wavelength conversion device, so the efficiency of the light source system can be improved. Moreover, the excitation light is directed to the wavelength conversion device by the light introducing device and the converted light that propagates towards the excitation light source is collected by the light collection device, which can avoid the loss of the converted light and the efficiency of the light source system can be further improved.

It will be apparent to those skilled in the art that various modification and variations can be made in the light source device and system of the present invention without departing from the spirit or scope of the invention. Thus, it is intended that the present invention cover modifications and variations that come within the scope of the appended claims and their equivalents.

What is claimed is:

1. A light source system, comprising:
   an excitation light source for generating an excitation light;
   a wavelength conversion device having a wavelength conversion material for converting the excitation light to a converted light;
   a first supplemental light source for generating a first supplemental light which has a spectral range that is different from a spectral range of the excitation light and that has no overlap with an absorption spectral range of the wavelength conversion material, wherein the wavelength conversion device scatters and at least partially reflects the first supplemental light without absorbing it,
   wherein the spectral ranges of the first supplemental light and the converted light at least partially overlap, wherein a difference of dominant wavelengths of the converted light and the first supplemental light is less than 20 nanometers, and wherein the excitation light source and the first supplemental light source are laser diodes;
   a first light introducing device for directing the first supplemental light to the wavelength conversion device;
   a first light collection device for collecting the first supplemental light scattered and reflected by the wavelength conversion device, wherein relative sizes of the first light introducing device and the light collection device are such that a luminous flux of the first supplemental light that is lost due to the first light introducing device is less than or equal to a quarter of the first supplemental light collected by the first light collection device.

2. The light source system of claim 1, wherein illumination areas of the excitation light and the first supplemental light on the wavelength conversion device at least partially overlap.

3. The light source system of claim 1, wherein the spectral range of the first supplemental light is narrower than the spectral range of the converted light.

4. The light source system of claim 1, wherein the first light introducing device further directs the excitation light to the wavelength conversion device, and the first light collection device further collects the converted light generated by the wavelength conversion device.

5. The light source system of claim 4, wherein the light source system further comprises a light combination device for combining the first supplemental light and the excitation light before they are incident to the first light introducing device.

6. The light source system of claim 1, further comprising:
   a light reflection substrate disposed on a side of the wavelength conversion device opposite to the first supplemental light source for reflecting the first supplemental light.

7. The light source system of claim 6, wherein the light reflection substrate is a dichroic filter, wherein the excitation light is incident to the dichroic filter from a side of the dichroic filter opposite to the wavelength conversion device and incident onto the wavelength conversion device after transmitting through the dichroic filter.

8. The light source system of claim 1, wherein the wavelength conversion device partially transmits the first supplemental light;
the light source system further comprising a second light collection device for collecting the first supplemental light which transmits through the wavelength conversion device, wherein the first light collection device collects the first supplemental light scattered and reflected by the wavelength conversion device and reflects it back to the wavelength conversion device.

9. The light source system of claim 1, wherein the first light introducing device is a light reflection device, which reflects the first supplemental light to the wavelength conversion device, and a projection area of the light reflection device on the first light collection device is less than or equal. to a quarter of the area of the first light collection device.

10. The light source system of claim 9, wherein the first light collection device is a lens or a light reflection surface.

11. The light source system of claim 1, further comprising:
a second supplemental light source for generating a second supplemental light, wherein the first light introducing device directs the second supplemental light to the wavelength conversion device, and wherein the first light collection device further collects the second supplemental light scattered and reflected by the wavelength conversion device.

12. The light source system of claim 11, wherein a spectral range of the second supplemental light is different from the spectral range of the first supplemental light and overlaps with the spectral range of converted light.

13. The light source system of claim 1, further comprising:
a second supplemental light source for generating a second supplemental light; and
a second light introducing device for directing the second supplemental light to the wavelength conversion device,
wherein the first light collection device further collects the second supplemental light scattered and reflected by the wavelength conversion device, and
wherein relative sizes of the second light introducing device and the first light collection device are such that a luminous flux of the second supplemental light that is lost due to the second light introducing device is less than or equal to a quarter of a luminous flux of the second supplemental light collected by the first light collection device.

14. The light source system of claim 13, wherein a spectral range of the second supplemental light is different from the spectral range of the first supplemental light and overlaps with the spectral range of converted light.

15. The light source system of claim 1, wherein the first light collection device includes a reflection surface for reflecting the first supplemental light scattered and reflected by the wavelength conversion device, and the first light introducing device is an opening on the reflection surface, through which the first supplemental light transmits, and wherein an area of the opening is less than or equal to a quarter of an area of the reflection surface.

16. The light source system of claim 15, wherein the reflection surface is a flat reflection surface or a curved reflection surface.

17. The light source system of claim 15, wherein the reflection surface is a spherical reflection surface or an ellipsoidal reflection surface.

18. The light source system of claim 17, wherein the opening on the reflection surface is a through hole or a transparent zone.

* * * * *